United States Patent [19]

Chemali et al.

[11] Patent Number: 4,646,026
[45] Date of Patent: Feb. 24, 1987

[54] METHOD AND APPARATUS FOR MEASURING RESISTIVITY OF AN EARTH FORMATION

[75] Inventors: Roland E. Chemali, Austin; William C. Dirk, Goforth, both of Tex.

[73] Assignee: Gearhart Industries, Inc., Fort Worth, Tex.

[21] Appl. No.: 786,184

[22] Filed: Oct. 10, 1985

Related U.S. Application Data

[63] Continuation of Ser. No. 499,273, May 31, 1983, abandoned.

[51] Int. Cl.$^4$ .............................................. G01V 3/18
[52] U.S. Cl. .................................... 324/373; 324/375; 324/366
[58] Field of Search ......... 324/357, 366, 371, 373–375

[56] References Cited

U.S. PATENT DOCUMENTS 4,335,353  6/1982  Lacour-Gayet ..................... 324/366

*Primary Examiner*—Ernest F. Karlsen
*Assistant Examiner*—Walter E. Snow
*Attorney, Agent, or Firm*—Hubbard, Thurman, Turner & Tucker

[57] ABSTRACT

A method and apparatus are described for reducing "Groeningen" effect and other anomaly induced errors in resistivity measurements of an earth formation. Such errors are typically noted during resistivity measurements of an earth layer and are generally referred to as "Groeningen" effect or "casing" effect. A sonde having a plurality of voltage measuring electrodes and current emitting electrodes is provided and suspended in a borehole by means of a conductive cable. The sonde is attached to the conductive cable by means of a length of insulated cable and two reference electrodes are disposed above the sonde. A survey current and at least two focusing currents are emitted from the sonde at alternate times or on alternate frequencies and various voltages induced by each current are measured and utilized to calculate a corresponding set of transfer impedances for that current. By utilizing the calculated transfer impedances, the relationships of focusing currents to survey current which is necessary to properly focus the sonde may be calculated. With the relationship of the survey current and focusing currents thus defined, the apparent resistivity of the formation may be expressed as a function of the transfer impedances and the currents without the necessity of actually altering the amounts of focusing current. One of the focusing currents is operated at a very low frequency to minimize the effect of a resistive anomaly and, by measuring the voltages induced by that current between widely spaced electrodes, the sonde may be operated at a faster rate than would otherwise be possible.

18 Claims, 2 Drawing Figures

METHOD AND APPARATUS FOR MEASURING RESISTIVITY OF AN EARTH FORMATION

CROSS-REFERENCE TO RELATED APPLICATIONS

This application is a continuation of application Ser. No. 499,273, filed May 31, 1983, now abandoned.

This application is related to copending U.S. patent application Ser. No. 499,274, filed May 31, 1983, now abandoned, the contents of which are incorporated herein by reference thereto.

BACKGROUND OF THE INVENTION

This invention relates to geological formation exploration in general and in particular to the utilization of resistivity measurements in the exploration of geological formations. More particularly, this invention relates to a method and apparatus for reducing anomaly induced errors in such resistivity measurements of geological formations.

It is well known in the prior art that the sedimentary portion of the earth's surface is generally comprised of successive layers or beds which generally do not have a constant thickness. Each of these beds will typically exhibit a certain resistivity characteristic which can be highly useful in the evaluation of a particular borehole with regard to the presence of hydrocarbon deposits. The resistivity characteristics of a particular formation are generally investigated by introducing a resistivity measurement sonde into the borehole. Such sondes are generally lowered into a bore hole on a cable utilizing a section of insulated cable generally known as the "bridle" which is generally disposed between the cable and the sonde.

While disposed in the borehole, the resistivity measuring sonde is utilized to generate a survey current and generally one or more focusing or "bucking" currents which are utilized to obtain deeper lateral penetration of the formation by the survey current. In previousy known resistivity measurement sondes, voltage measurements taken between electrodes disposed on the sonde are utilized to constantly adjust the amount of focusing current necessary to optimize the penetration of the survey current into the formation. A return electrode is utilized at the surface to provide a return for the various currents and permit the current measurements necessary to determine formation resistivity. A voltage reference electrode is also generally utilized and is generally located at a point between the lower part of the conductive cable and the sonde.

While this system has worked well for many years, certain field conditions have been encountered which cause errors in the calculated or apparent resistivity of the formation. One such error is induced due to an anomaly in the resistance of a formation above the sonde which causes variations in the return path of the survey and focusing currents to the return electrode. When attempting resistivity measurements in a low resistance earth formation below a highly resistive bed, the survey and focusing currents tend to return along the well casing or cable and induce a greater than normal voltage at the reference electrode disposed above the sonde. This results in an error in calculation due to the fact that the voltage differential between the sonde and the reference electrode will not be equal to the voltage differential between the sonde and the theoretical point at infinity utilized in these calculations.

This particular error, sometimes referred to as the "Groeningen" effect or "casing" effect is particularly distressing in that the resultant resistivity measurements are similar in nature to those associated with petrochemical deposits when such deposits are not present. The expense associated with drilling and testing these wellbores makes it desirable that a method and apparatus be defined to correct for or reduce the errors induced by such resistive anomalies. One method of correcting for this error involves the utilization of very low frequency currents; however, since several cycles of current are necessary to complete a single resistivity measurement, the speed at which the sonde must be operated in this method is quite slow. The expense associated with these wells and equipment dictates that these measurements be taken as rapidly as possible, thereby eliminating this approach as a viable alternative.

SUMMARY OF THE INVENTION

It is therefore one object of the present invention to provide an improved apparatus for reducing anomaly induced errors in resistivity measurements of earth formations.

It is another object of the present invention to provide an improved method for reducing anomaly induced errors in resistivity measurements of earth formations.

It is yet another object of the present invention to provide an improved method for reducing anomaly induced errors in resistivity measurements of earth formations which permits the resistivity measurement device to be operated at normal speeds.

It is another object of the present invention to provide an improved method for reducing anomaly induced errors in resistivity measurements of earth formations which can be utilized in conjunction with known resistivity measurement sondes.

The foregoing objects are achieved as is now described. A sonde having a plurality of voltage measuring electrodes and current emitting electrodes is provided and suspended in a borehole by means of a conductive cable. The sonde is attached to the conductive cable by means of a length of insulated cable and two reference electrodes are attached to the cable above the sonde. A survey current and at least two focusing currents are emitted from the sonde at alternate times or on alternate frequencies and various voltages induced by each current are measured and utilized to calculate a corresponding set of transfer impedances for that current. By utilizing the calculated transfer impedances, the relationships of focusing currents to survey current which is necessary to properly focus the sonde may be calculated. With the relationship of the survey current and focusing currents thus defined, the apparent resistivity of the formation may be expressed as a function of the transfer impedances and the currents without the necessity of actually altering the amounts of focusing current. One of the focusing currents is operated at a very low frequency to minimize the effect of a resistive anomaly and, by measuring the voltages induced by that current between widely spaced electrodes, the sonde may be operated at a faster rate than would otherwise be possible.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
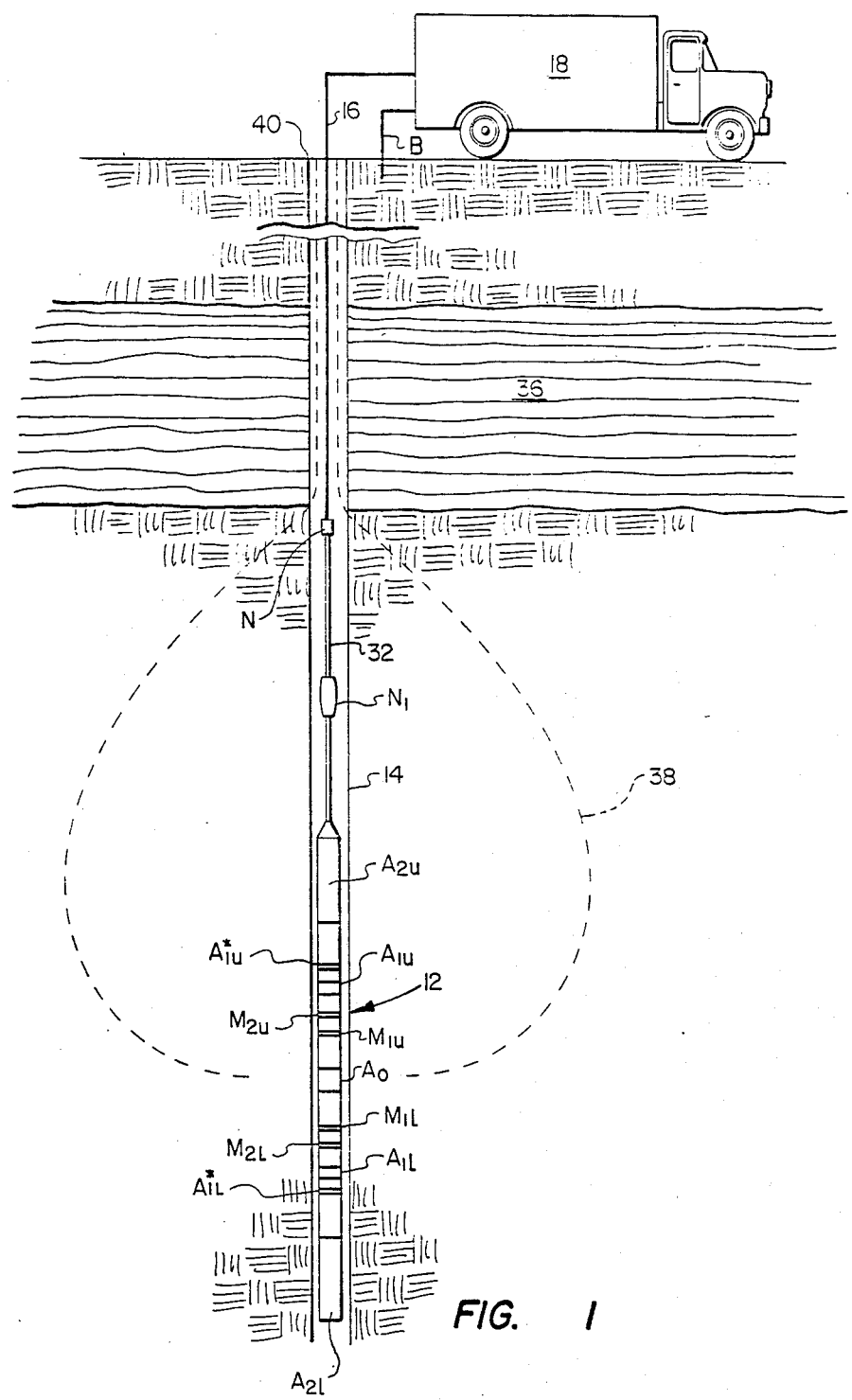
FIG. 1 is a partially schematic, partially diagrammatic view of the resistivity measuring apparatus of the present invention.

With reference now to the figures, and in particular with reference to FIG. 1, there is depicted a partially schematic, partially diagrammatic view of the resistivity measuring apparatus of the present invention. The techniques disclosed herein are similar in nature to the techniques disclosed in the above-referenced related application and that application is hereby incorporated herein by reference thereto.

As in the copending application, the method and apparatus disclosed herein will find application with many different types of resistivity measuring devices; however, for purposes of explanation, the embodiment disclosed herein is described with respect to a so-called "deep laterolog." The "deep laterolog" is designed to measure formation resistivities at greater distances from the borehole and, in particular, beyond the "invaded zone" where the presence of drilling fluids may alter the formation resistivity.

As in most typical installations of this type, the system includes a sonde 12 suspended in a borehole 14 by means of a wireline cable 16. Electrical conductors (not shown) disposed within wireline cable 16 are coupled to various electronic processing devices contained in van 18. Sonde 12 includes a plurality of voltage measuring electrodes $M_{1L}$ and $M_{1U}$, $M_{2L}$ and $M_{2U}$, and $A_{1L}^*$ and $A_{1U}^*$ which are disposed on the surface of sonde 12 on either side of a survey current emitting electrode $A_0$. The subscripts U and L signify the upper and lower of each pair of a pair of symmetrical electrodes. Sonde 12 also includes a plurality of focus current emitting electrodes $A_{1L}$, $A_{1U}$, $A_{2L}$ and $A_{2U}$.

Also depicted in FIG. 1 is a voltage reference electrode or torpedo N which is separated from sonde 12 by a length of insulated cable 32, typically referred to as a "bridle." Located between sonde 12 and torpedo N is an additional voltage measuring electrode $N_1$. Electrode $N_1$ is particularly useful in the method disclosed herein for reducing errors in the formation resistivity measurements which may be caused by resistive anomalies such as zone 36.

As is depicted in FIG. 1, a typical path of return for survey current 38 is altered by the highly resistive nature of zone 36. Rather than proceeding radially outward to return electrode B, the path of survey current is altered by the presence of wireline cable 16 and well casing 40. Those skilled in the art will appreciate that the electromagnetic phenomena known as "skin effect" will enhance this alteration of return path and induce a greater than normal voltage at electrode N. This error may be minimized by utilizing very low frequency currents (typically less than one hertz); however, since it is generally acknowledged that three cycles of current are necessary for each resistivity reading, a resistivity log of several thousand feed of borehole could become very time consuming.

Fortunately, the "Groeningen" effect varies very slowly with depth and may be compensated for by utilizing this novel technique of independent voltage and current measurements which permits sonde 12 to be operated at normal logging speeds while simultaneously measuring and computing a "focused" condition which is corrected for the errors induced by the effect.

In order to understand the novel method and apparatus of the present invention, it is necessary to understand the operation of a conventional deep laterolog system.

Generally, a survey current $I_0$ is emitted by the central electrode $A_0$ and a plurality of focusing currents are emitted from electrodes $A_{1L}$, $A_{1U}$, $A_{2L}$ and $A_{2U}$. The ratios between focusing currents and survey current are constantly adjusted to maintain a zero or null voltage gradient between electrode pairs $M_1$ and $M_2$ and between $A_1^*$ and $A_2$.

In order to simplify the notation utilized herein, the average voltage of symmetrical electrode pairs, without U and L subscripts, is written utilizing the rule expressed in equation (1):

$$V_{Mj} = \frac{V_{MjU} + V_{MjL}}{2} \qquad (1)$$

Similarly, the sum of currents flowing from (or to) symmetrical electrodes will be written without the U and L subscript as follows:

$$I_1 = (I_{1U} + I_{1L}) \qquad (2)$$

When the aforementioned zero voltage gradient is achieved and the sonde is "focused," the apparent resistivity of a formation can be expressed by:

$$Ra = \frac{K[V_{Mi} - V_{No}]}{I_0} \qquad (3)$$

Where $N_0$ is a remote electrode which is ideally at electrical infinity. In actual practice, the voltage measurement is taken with respect to torpedo N. In general, torpedo N is far enough away from sonde 12 that no error occurs. However, as depicted in FIG. 1, measurements taken beneath a zone of high resistivity can be perturbed by the presence of the current flowing down wireline cable 16 to sonde 12.

The method of the present invention utilizes four nominal value currents which are emitted from sonde 12. A survey current $I_0$ is emitted from electrode $A_0$. Three separate focusing currents are also utilized. Current $I_1$ is emitted from electrodes $A_{1U}$ and $A_{1L}$; current $I_2$ is emitted from electrodes $A_{2U}$ and $A_{2L}$; and, current $I_2^*$ is also emitted from electrodes $A_{2U}$ and $A_{2L}$.

Each of these currents is emitted independently which, as those skilled in the art will appreciate, can be accomplished by alternately emitting each current or by continuously emitting all currents at various different frequencies. No attempt is made during this process to alter the amount of focusing current being emitted to actually balance sonde 12. In the preferred mode of the present invention, currents $I_0$ and $I_1$ are alternately emitted at several hundreds of hertz, current $I_2$ is emitted at less than 100 hertz and current $I_2^*$ at a very low frequency (less than one hertz).

Preferably, during the period of time that each current is emitted, a series of five voltage potentials are measured:

| Voltage | Measuring Point |
|---------|-----------------|
| $V_1$ | between $M_1$ and N |
| $V_2$ | between $M_1$ and $M_2$ |
| $V_3$ | between $A_1^*$ and $A_2$ |
| $V_4$ | between $M_1$ and $N_1$ |
| $V_5$ | between $N_1$ and N |

Each of these voltages is utilized in conjunction with each current to generate five transfer impedances for sonde 12 for each current source. In this manner, as in the above-referenced copending application, the principle of superposition in linear circuitry permits the amounts of various currents necessary to achieve a desired voltage level to be simply and easily computed utilizing the transfer impedances. The matrix of thus calculated transfer impedances is as follows:

(4)

|        | $V_1$ | $V_2$ | $V_3$ | $V_4$ | $V_5$ |
|--------|-------|-------|-------|-------|-------|
| $I_0$  | $a_{01}$ | $a_{02}$ | $a_{03}$ | $a_{04}$ | $a_{05}$ |
| $I_1$  | $a_{11}$ | $a_{12}$ | $a_{13}$ | $a_{14}$ | $a_{15}$ |
| $I_2$  | $a_{21}$ | $a_{22}$ | $a_{23}$ | $a_{24}$ | $a_{25}$ |
| $I_2^*$ | $a_{31}$ | $a_{32}$ | $a_{33}$ | $a_{34}$ | $a_{35}$ |

By now setting $I_0$ equal to unity and writing the conditions necessary to balance sonde 12, the theoretical amount of focusing currents necessary to balance the tool may be derived. The balance conditions are:

$$I_0 = 1 \tag{5}$$

$$V_2 = {}^V M_1 - {}^V M_2 = a_{02}I_0 + a_{12}I_1 + a_{22}I_2 = 0 \tag{6}$$

$$V_3 = {}^V A_1^* - {}^V A_2 = a_{03}I_0 + a_{13}I_1 + a_{23}I_2 = 0 \tag{7}$$

By solving equations (5), (6) and (7) we can determine the exact amount of focusing current necessary to balance sonde 12 without the limitations generally imposed by physical constraints in existing systems.

$$I_0 = 1 \tag{8}$$

$$I_1 = \frac{a_{02}a_{23} - a_{03}a_{22}}{a_{22}a_{13} - a_{12}a_{23}} \tag{9}$$

$$I_2 = \frac{a_{02}a_{13} - a_{03}a_{12}}{a_{12}a_{23} - a_{22}a_{13}} \tag{10}$$

Given the precise amount of focusing current needed to balance sonde 12, the apparent resistivity of sonde 12 can be expressed as follows:

$$R_a = K(a_{01}I_0 + a_{11}I_1 + a_{21}I_2)/I_0 \tag{11}$$

As those skilled in the art will appreciate, by substituting equations (9) and (10) into equation (11) the apparent resistivity of the formation may be expressed as a function of transfer impedances with $I_0$ being constrained in unity.

This expression of the apparent resistivity of the formation is not corrected for the resistive anomaly of zone 36. This error can be seen to be an error in transfer impedance $a_{21}$ due to the spurious voltage induced between electrodes $M_1$ and N by the altered current path. In order to reduce this error it is only necessary to replace transfer impedance $a_{21}$ by a combination of two different transfer impedances, only one of which can be measured at a very low frequency. Indeed, since the voltage difference between electrodes $M_1$ and N is equal to the voltage difference between electrodes $M_1$ and $N_1$ plus the voltage difference between electrodes $N_1$ and M, transfer impedance $a_{21}$ can be replaced by a combination of transfer impedances $a_{24}$ and $a_{35}$, where $a_{24}$ is measured at a less than one hundred hertz and $a_{35}$ is measured at a very low frequency. By having measured the voltage induced between electrodes $N_1$ and N at a very low frequency, this measurement can be combined with the voltage induced between electrodes $M_1$ and $N_1$ at normal survey frequencies to generate a corrected voltage measurement as expressed in equation (12):

$$R_a = K[a_{01}I_0 + a_{11}I_1 + (a_{24} + a_{35})I_2]/I_0 \tag{12}$$

Those ordinarily skilled in the art will appreciate that the physical distances between electrodes $M_1$, $N_1$ and N are much greater than the distances between electrodes disposed on sonde 12, and this physical separation will permit the measurement of the voltage between electrode $N_1$ and N to be accomplished at a very low frequency.

Figure 2:
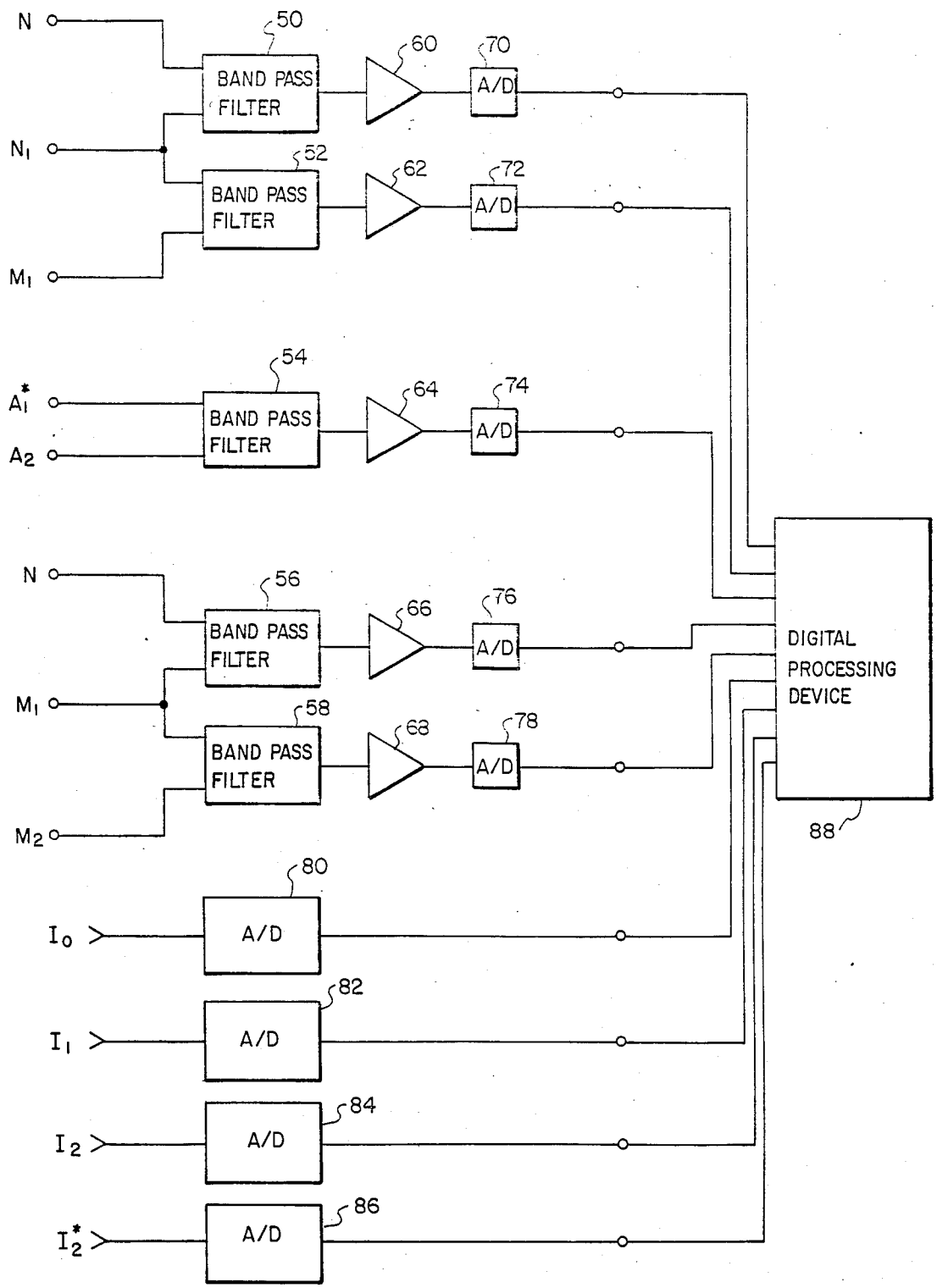
FIG. 2 is a block diagram of the circuitry of the resistivity measuring apparatus of the present invention.

A block diagram of the circuitry necessary to perform this method is depicted in FIG. 2. As can be seen, the voltages at each electrode on sonde 12 are coupled to appropriate band pass filters 50, 52, 54, 56 and 58, in those embodiments in which differing frequencies are utilized. The outputs of each band pass filter are then amplified by amplifiers 60, 62, 64, 66 and 68 and coupled to analog-to-digital converters 70, 72, 74, 76 and 78. Similarly, the amount of current emitted from each electrode is coupled to an appropriate analog-to-digital converter 80, 82, 84 and 86. The outputs of each analog-to-digital converter are then coupled to an appropriately programmed digital processing device 88 which is utilized, in a preferred embodiment of the present invention, to calculate the necessary transfer impedances and to control the selective application of various survey and focusing currents in a manner well known in the art.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method for reducing anomaly induced errors in resistivity measurements of an earth formation traversed by a borehole in which the resistivity measurement is accomplished utilizing a sonde suspended in said borehole from a conductive cable in the borehole, said sonde having a plurality of voltage measuring electrodes and current emitting electrodes disposed thereon and a first reference electrode disposed above said sonde, comprising:

emitting a survey current from a selected one of said plurality of current emitting electrodes and measuring the voltage induced by said survey current at least a selected one of said voltage measuring electrodes;

disposing a second reference electrode between said first reference voltage electrode and said sonde;

emitting a first focusing current at a first selected frequency from a selected one of said plurality of current emitting electrodes and measuring the voltage induced by said first focusing current between said sonde and said second reference electrode;

emitting a second focusing current at a frequency substantially below said first selected frequency from a selected one of said plurality of current emitting electrodes and measuring the voltage induced by said second focusing current between said second reference electrode and said first reference electrode wherein said second focusing current is less subject to resistive anomalies than is said survey current;

combining the voltage induced by said first focusing current and the voltage induced by said second focusing current to obtain a resultant total voltage measurement between said sonde and said first reference electrode wherein said resultant total voltage measurement has a reduced anomaly induced error; and combining the voltage induced by said survey current between said selected voltage measuring electrode and said first reference electrode with said resultant total voltage measurement to obtain a resistivity measurement with reduced anomaly induced error.

2. The method for reducing anomaly induced errors in resistivity measurements of an earth formation according to claim 1 further including the step of calculating a first set of transfer impedances for said sonde by means of measuring said survey current and said voltage induced by said survey current.

3. The method for reducing anomaly induced errors in resistivity measurements of an earth formation according to claim 2 further including the step of calculating a second set of transfer impedances for said sonde by means of measuring said first focusing current and said voltage induced by said first focusing current.

4. The method for reducing anomaly induced errors in resistivity measurements of an earth formation according to claim 3 further including the step of calculating a third set of transfer impedances for said sonde by means of measuring said second focusing current and the voltage induced by said second focusing current.

5. The method for reducing anomaly induced errors in resistivity measurements of an earth formation according to claim 4 further including the step of calculating the amount of focusing current needed to properly focus said sonde by utilizing said first, second and third sets of transfer impedances.

6. The method for reducing anomaly induced errors in resistivity measurements of an earth formation according to claim 5 further including the step of calculating the resistivity of an earth formation transversed by said sonde as a function of said survey current, said first focusing current, said second focusing current and said first, second and third sets of transfer impedances.

7. Apparatus for correcting anomaly induced errors in resistivity measurements of an earth formation traversed by a borehole in which the resistivity measurement is accomplished utilizing voltage measurements between a sonde suspended in said borehole from a conductive cable and a first reference electrode disposed above said sonde, comprising:

means for emitting a first focusing current from said sonde at a selected frequency;

a second reference electrode disposed between said first reference electrode and said sonde;

means for measuring a first voltage induced by said first focusing current between said anode and said second reference electrode;

means for emitting a second focusing current from said sonde at a frequency substantially below said selected frequency;

means for measuring a second voltage induced by said second focusing current between said second reference electrode and said first reference electrode;

means for combining said first voltage and said second voltage wherein said resultant voltage is a corrected measurement of the voltage measurement between said sonde and said first reference electrode; and means for combining said resultant voltage with said resistivity measurement to correct said resistivity measurement.

8. The apparatus for correcting anomaly induced errors in resistivity measurements of an earth formation according to claim 7 further including an elongated insulated cable disposed between said sonde and said first reference electrode.

9. The apparatus for correcting anomaly induced errors in resistivity measurements of an earth formation according to claim 8 wherein said second reference electrode is disposed on said elongated insulated cable.

10. The apparatus for correcting anomaly induced errors in resistivity measurements of an earth formation according to claim 7 wherein said sonde includes a plurality of current emitting electrodes and wherein said survey current is emitted from a first selected current emitting electrodes and wherein said first and second focusing currents are emitted from a second selected current emitting electrode.

11. A method for reducing anomaly induced errors in resistivity measurements of an earth formation traversed by a borehole, in which the resistivity measurement is accomplished utilizing a sonde suspended in said borehole from a conductive cable in said borehole, said sonde having a plurality of voltage measuring electrodes and current emitting electrodes disposed thereon, comprising:

suspending said sonde from said conductive cable utilizing a length of insulated cable;

disposing a first reference electrode above said sonde;

disposing a second reference electrode on said insulated cable at a point between said first reference electrode and said sonde;

emitting a survey current from a selected one of said current emitting electrodes;

measuring the voltages induced by said survey current at at least one of said voltage measuring electrodes;

computing at least a first set of transfer impedances utilizing said voltages induced at at least one of said voltage measuring electrodes and said survey current;

emitting a first focusing current from a selected one of said current emitting electrodes;

measuring the voltages induced by said first focusing current between said sonde and said second reference electrode;

computing at least a second set of transfer impedances utilizing said voltages induced between said sonde and said second reference electrode and said first focusing current;

emitting a second focusing current from a selected one of said current emitting electrodes at a frequency substantially below the frequency of said first focusing current;

measuring the voltages induced by said second focusing current between said second reference electrode and said first reference electrode;

computing at least a third set of transfer impedances utilizing said voltages induced between said second reference electrode and said first reference electrode and said second focusing current; and determining the resistivity of the earth formation as a function of said first, second and third sets of transfer impedances.

12. A method of determining the resistivity of an earth formation traversed by a borehole, which comprises the steps of:

suspending a sonde having a plurality of current emitting electrodes and a plurality of voltage measuring electrodes in said borehole;

disposing a first reference electrode in said borehole above said sonde;

disposing a second reference electrode in said borehole between said first reference electrode and said sonde;

emitting a survey current from a selected one of said current emitting electrodes;

measuring the voltage induced by said survey current between a selected one of said voltage measuring electrodes and said first reference electrode;

calculating a first transfer impedance utilizing said survey current and the measured voltage induced between said selected voltage measuring electrode and said first reference electrode;

emitting a first focusing current from at least a selected one of said current emitting electrodes;

measuring the voltage induced by said first focusing current between said selected voltage measuring electrode and said first reference electrode;

calculating a second transfer impedance utilizing said first focusing current and the measured voltage between said selected voltage measuring electrode and said first reference electrode;

emitting a second focusing current from a selected one of said current emitting electrodes;

measuring the voltage induced by said second focusing current between said selected voltage measuring electrode and said second reference electrode;

calculating a third transfer impedance utilizing said second focusing current and the measured voltage induced between said selected voltage measuring electrode and said second reference electrode;

emitting a third focusing current from a selected one of said current emitting electrodes at a frequency substantially below the frequency of said second focusing current;

measuring the voltage induced by said third focusing current between said second reference electrode and said first reference electrode;

calculating a fourth transfer impedance utilizing said third focusing current and the measured voltage induced between said second reference electrode and said first reference electrode;

and determining the resistivity of the earth formation as a function of said first, second, third, and fourth transfer impedances.

13. The method as claimed in claim 12 wherein said second focusing current is emitted at a frequency substantially below the frequency of said survey current.

14. The method as claimed in claim 12 wherein said determining step includes the steps of:

(a) multiplying said first transfer impedance by said survey current;

(b) multiplying said second transfer impedance by said first focusing current;

(c) multiplying the sum of said third and fourth transfer impedances by said second focusing current; and, (d) dividing the sum of the products obtained in steps (a), (b) and (c) by the survey current.

15. A method for reducing anomaly induced errors in resistivity measurements of an earth formation traversed by a borehole in which the resistivity measurement is accomplished utilizing a sonde suspended in said borehole from a conductive cable, said sonde having a plurality of voltage measuring electrodes and current emitting electrodes disposed thereon and said cable having a first reference electrode disposed thereon, said resistivity measurement being accomplished by emitting a survey current from a selected one of said current emitting electrodes and measuring the voltage induced by said survey current between at least a selected one of said voltage measuring electrodes and said first reference electrode, which comprises the steps of:

(a) disposing a second reference electrode between said sonde and said first reference electrode;

(b) emitting a first focusing current from one of said current emitting electrodes;

(c) measuring the voltage induced by said first focusing current between said selected voltage measuring electrode and said second reference electrode;

(d) emitting a second focusing current from one of said current emitting electrodes at a frequency substantially below the frequency of said first focusing current;

(e) measuring the voltage induced by said second focusing current between said second reference electrode and said first reference electrode;

(f) combining the voltages measured in steps (c) and (e) to obtain a resultant total voltage between said selected voltage measuring electrode and said first reference electrode wherein said resultant total voltage has a reduced anomaly induced error; and, (g) combining the resultant total voltage obtained in step (f) with the voltage induced by said survey current between said selected voltage measuring electrode and said first reference electrode to obtain a resistivity measurement with reduced anomaly induced error.

16. The method as claimed in claim 15, wherein said step of combining the voltage measured in steps (c) and (e) includes the steps of:

calculating a first transfer impedance by dividing the voltage measured in step (c) by the first focusing current;

calculating a second transfer impedance by dividing the voltage measured in step (e) by the second focusing current; and, multiplying the sum of the first and second transfer impedances by said first focusing current to obtain said resultant total voltage.

17. The method as claimed in claim 16, wherein said step of combining the resultant total voltage obtained in step (f) with the voltage induced by said survey current between said selected voltage measuring electrode and said first reference electrode includes the steps of:

dividing the sum of said survey current induced voltage and said resultant total voltage by said survey current.

18. Apparatus for determining the resistivity of an earth formation traversed by a borehole, which comprises:

a sonde adapted to be suspended in and moved through said borehole;

a first reference electrode adapted to be suspended in and moved through said borehole above said sonde;

a second reference electrode disposed between said sonde and said first reference electrode;

means for emitting a survey current from said sonde;

means for measuring the voltage induced by said survey current between said sonde and said first reference electrode;

means for calculating a first transfer impedance utilizing said survey current and the measured voltage induced between said sonde and said first reference electrode;

means for emitting a first focusing current from said sonde;

means for measuring the voltage induced by said first focusing current between said sonde and said reference first electrode;

means for calculating a second transfer impedance utilizing said first focusing current and the measured voltage between said sonde and said first reference electrode;

means for emitting a second focusing current from said sonde;

means for measuring the voltage induced by said second focusing current between said sonde and said second reference electrode;

means for calculating a third transfer impedance utilizing said second focusing current and the measured voltage induced between said sonde and said second reference electrode;

means for emitting a third focusing current from said sonde at a frequency substantially below the frequency of said second focusing current;

means for measuring the voltage induced by said third focusing current between said second reference electrode and said first reference electrode;

means for calculating a fourth transfer impedance utilizing said third focusing current and the measured voltage induced between said second reference electrode and said first reference electrode;

and means for determining the resistivity of the earth formation as a function of said first, second, third, and fourth transfer impendances.

* * * * *